US006582109B2

(12) United States Patent  (10) Patent No.: US 6,582,109 B2
Miller  (45) Date of Patent: *Jun. 24, 2003

(54) ILLUMINATION DEVICE FOR EXTERIOR MIRROR

(75) Inventor: Larry E. Miller, Grand Haven, MI (US)

(73) Assignee: Donnelly Corporation, Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/822,111

(22) Filed: Mar. 30, 2001

(65) Prior Publication Data

US 2002/0191408 A1 Dec. 19, 2002

Related U.S. Application Data

(63) Continuation of application No. 09/406,966, filed on Sep. 28, 1999, now Pat. No. 6,227,689.

(51) Int. Cl.⁷ ................................................. B60R 1/12
(52) U.S. Cl. ...................... 362/494; 362/226; 362/135; 362/492
(58) Field of Search ................................ 362/135, 226, 362/492, 494

(56) References Cited

U.S. PATENT DOCUMENTS

| 4,274,078 A | 6/1981 | Isobe et al. ................... 340/98 |
| 4,475,100 A | 10/1984 | Duh ............................ 340/98 |
| 4,809,137 A | 2/1989 | Yamada ....................... 362/61 |
| 5,017,903 A | 5/1991 | Krippelz, Sr. ................ 340/472 |
| 5,038,255 A | 8/1991 | Nishihashi et al. ............ 362/61 |
| 5,059,015 A | 10/1991 | Tran ........................... 359/844 |
| 5,109,214 A | 4/1992 | Heidman, Jr. ................. 340/475 |
| 5,151,824 A | 9/1992 | O'Farrell .................... 359/604 |
| 5,207,492 A | 5/1993 | Roberts ........................ 362/30 |
| 5,313,335 A | 5/1994 | Gray et al. ................... 359/839 |
| 5,371,659 A | 12/1994 | Pastrick et al. ............. 362/83.1 |

(List continued on next page.)

FOREIGN PATENT DOCUMENTS

| DE | 3803510 A1 | 9/1988 |
| EP | 58188733 | 11/1983 |
| GB | 1555541 | 11/1979 |
| GB | 2161440 A | 1/1986 |
| JP | 61188242 | 8/1986 |

OTHER PUBLICATIONS

Commonly assigned co–pending U.S. patent application Ser. No. 09/102,414, filed Jun. 22, 1998 by Pastrick et al. for Vehicle Exterior Mirror System with Signal Light.

Commonly assigned co–pending U.S. patent application Ser. No. 09/335,010, filed Jun. 17, 1999 by Pastrick et al. for Vehicle Exterior Mirror System with Signal Light.

(List continued on next page.)

Primary Examiner—Stephen Husar
(74) Attorney, Agent, or Firm—Van Dyke, Gardner, Linn & Burkhart, LLP

(57) ABSTRACT

An illumination device for an exterior rearview mirror of a vehicle comprises a bulb holder which comprises a pair of stamped terminals and a housing which is preferably injection molded about the stamped terminals. One end of the stamped terminals provides for connection to a light bulb or other illumination source, while the other end of the stamped terminals provides for electrical connection to a vehicle or mirror wiring harness. Preferably, the body of the bulb holder is molded from a soft plastic material to facilitate easy insertion and removal of the bulb holder in the mirror assembly, and to further ease connection of the vehicle wiring harness to the wiring terminals. The soft plastic molding further provides a water-tight seal between the body and the stamped terminals and between the body and the illumination device of the rearview mirror assembly.

23 Claims, 5 Drawing Sheets

U.S. PATENT DOCUMENTS

| | | | |
|---|---|---|---|
| 5,497,305 A | | 3/1996 | Pastrick et al. ............. 362/83.1 |
| 5,497,306 A | | 3/1996 | Pastrick ..................... 362/83.1 |
| 5,499,169 A | | 3/1996 | Chen ......................... 362/83.1 |
| 5,624,176 A | | 4/1997 | O'Farrell et al. ........... 362/83.1 |
| 5,669,699 A | | 9/1997 | Pastrick et al. ............. 362/83.1 |
| 5,669,704 A | | 9/1997 | Pastrick ..................... 362/83.1 |
| 5,669,705 A | | 9/1997 | Pastrick et al. ............. 362/83.1 |
| 5,823,654 A | | 10/1998 | Pastrick et al. ............. 362/83.1 |
| 5,863,116 A | | 1/1999 | Pastrick et al. .............. 362/494 |
| 5,871,275 A | | 2/1999 | O'Farrell et al. ............ 362/494 |
| 5,879,074 A | | 3/1999 | Pastrick ...................... 362/494 |
| 6,049,271 A | | 4/2000 | Chu ............................ 362/494 |
| 6,074,077 A | * | 6/2000 | Pastrick et al. .............. 362/494 |
| 6,086,229 A | * | 7/2000 | Pastrick ...................... 362/494 |
| 6,149,287 A | * | 11/2000 | Pastrick et al. .............. 362/494 |
| 6,176,602 B1 | * | 1/2001 | Pastrick et al. .............. 362/494 |
| 6,227,689 B1 | * | 5/2001 | Miller ......................... 362/226 |
| 6,276,821 B1 | * | 8/2001 | Pastrick et al. ............. 362/494 |

OTHER PUBLICATIONS

Commonly assigned co–pending U.S. patent application Ser. No. 09/232,316, filed Jan. 18, 1999 by Pastrick et al. for A Security Lighted Vehicular Exterior Rearview Mirror System.

Commonly assigned co–pending U.S. patent application Ser. No. 09/174,757, filed Oct. 19, 1998 by Pastrick et al. for A Security Lighted Vehicular Exterior Rearview Mirror System.

Commonly assigned co–pending U.S. patent application Ser. No. 09/259,815, filed Feb. 26, 1999 by Pastrick for Vehicle Exterior Mirror System with Signal Light Assembly.

* cited by examiner

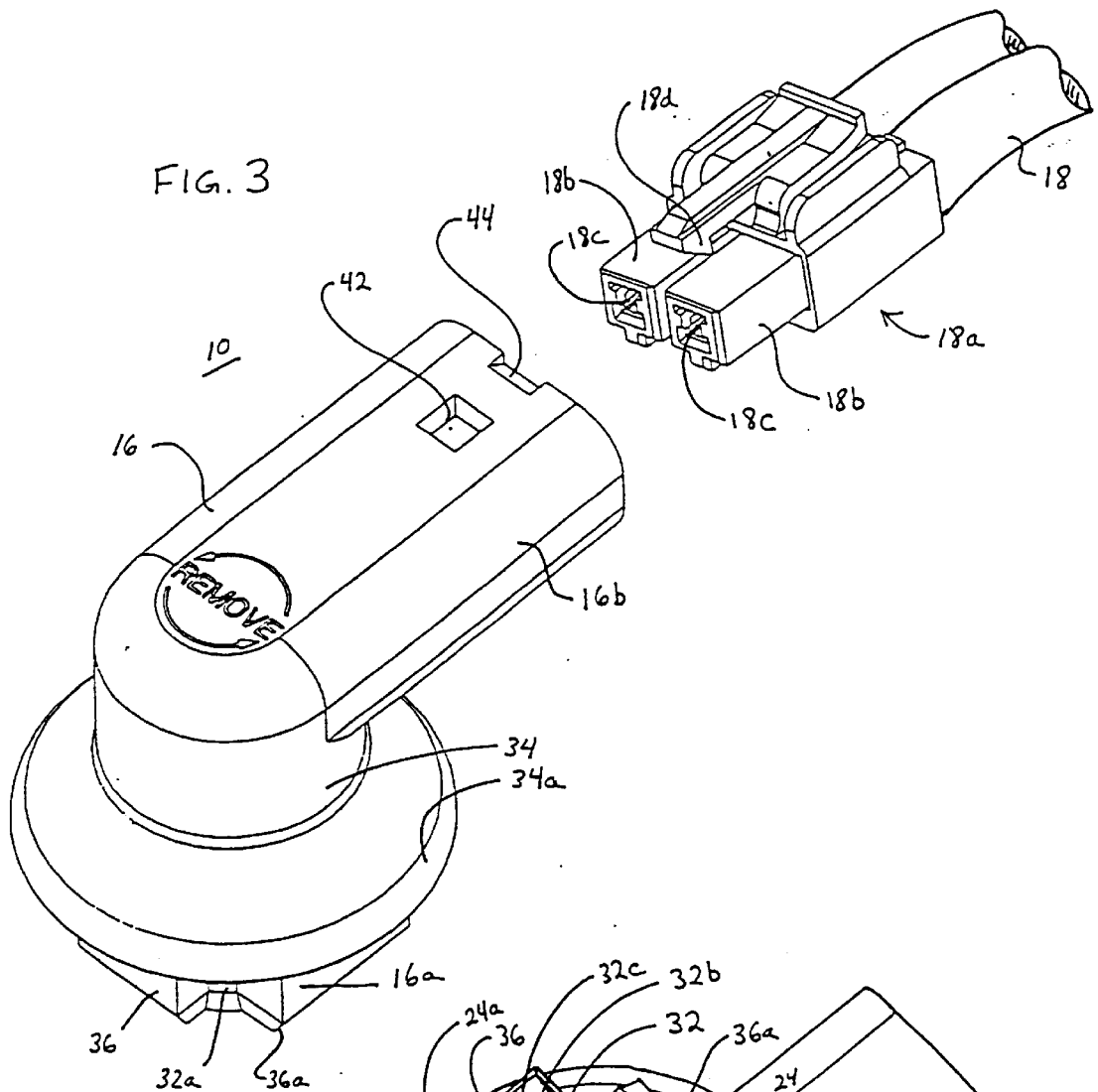
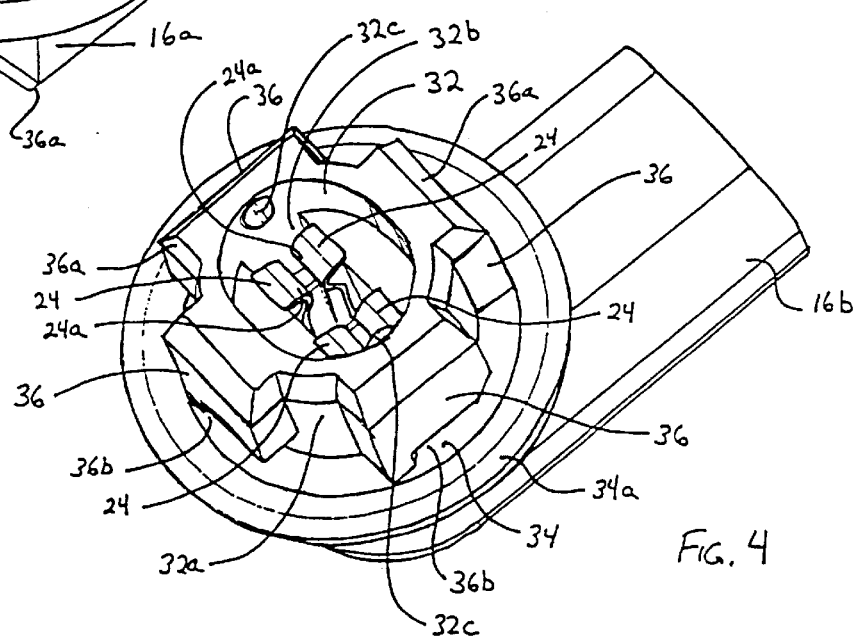

ILLUMINATION DEVICE FOR EXTERIOR MIRROR

CROSS-REFERENCE TO RELATED APPLICATION

This is a continuation of U.S. patent application Ser. No. 09/406,966, filed Sep. 28, 1999 by Larry E. Miller, entitled ILLUMINATION DEVICE FOR EXTERIOR MIRROR, now U.S. Pat. No. 6,227,689, which is hereby incorporated herein by reference.

BACKGROUND OF THE INVENTION

The present invention relates generally to lights for exterior rearview mirrors of vehicles and, more particularly, to an illumination device which may be easily installed to the rearview mirror assembly.

It is known to install lights on or within exterior rearview mirror assemblies of vehicles. The lights may be turn signals, brake lamps, security lighting systems or the like. Typically, such lights require access to the illumination source (such as incandescent bulbs or the like) for ease of service and also require that detachable electrical connection be made to the vehicle electric. An example of a prior art incandescent bulb holder is shown in FIG. 1.

The prior art bulb holder 2 comprises a mounting portion 3, which typically receives or mounts a bulb 7, such as an incandescent bulb, a fluorescent bulb, or the like. One or more wires 4 extend from electrical terminals within mounting portion 3 and outwardly therefrom. Wires 4 typically individually terminate in individual connectors 5 (although they may terminate in a connector block or multi-pin connector). For example, the wires 4 may be twisted or pig-tailed together with a single pin connector 5 at the end of each wire, as shown in FIG. 1. The single pin connectors 5 are individually connected to a vehicle wiring or mirror wire harness 6 to provide electrical power or control to the lights from the vehicle interior. The individual wires and/or connectors extending from the bulb holder can add cost and assembly complications in manufacture, since the wires must be soldered, clamped or otherwise secured to bulb terminals or contacts within the bulb holders. Furthermore, the point of entry/exit of wires 4 into bulb holder 3 can be routes of water, dirt, and/or contaminant or the like ingress, potentially leading to part deterioration.

SUMMARY OF THE INVENTION

The present invention is intended to provide an illumination device which is easily and economically connectable to the vehicle electrics when mounted to a portion of an exterior rearview mirror of a vehicle. The illumination device of the present invention is low cost and facilitates easy installation of the illumination device to the mirror and further facilitates easy electrical connection of the vehicle wiring to the illumination device.

According to an aspect of the present invention, an illumination device is mountable to an exterior rearview mirror assembly of a vehicle. The illumination device comprises a pair of metallic or otherwise conductive first terminals for engaging a corresponding pair of metallic or otherwise conductive portions of an illumination bulb, and a pair of second terminals electrically, each of which is connected to a corresponding one of the first bulb terminals. The vehicle wiring directly connects to the second terminals to provide electrical power to the illumination bulb. An insulating housing is provided that at least partially encases the first and second terminals. The housing is preferably detachably mountable to the illumination device or module of the exterior rearview mirror assembly of the vehicle. Alternatively, the illumination device or module can consist of a unitary module comprising a bulb, reflector and lens in a single unitary sealed body, which is disposable should the bulb fail. Preferably, each of the connected first and second terminals are integrally formed from an electrically conductive material, such as by a metal stamping or the like. Preferably, the housing is integrally molded from an at least substantially insulating polymeric material, as is known in the molding art, with the integrally formed first and second terminals to provide an integrally molded bulb and socket module. Because the housing is integrally molded around two or more first and second terminals, the housing separates and electrically insulates each metal stamping from the other stampings. Furthermore, the integral molding of the housing protects the stampings from water, dirt or other contaminants and provides a substantially water impervious bulb and socket module.

According to another aspect of the present invention, an exterior rearview mirror assembly for a vehicle comprises a mirror housing, a reflective element housed within the mirror housing, a mounting portion which is mountable to the vehicle, and at least one illumination device. The illumination device comprises a bulb holder, which comprises at least two first bulb terminals for connecting to corresponding terminals on an illumination source or bulb, at least two second terminals connectable to a vehicle wiring, and a terminal housing. Preferably, the first and second terminals are integrally formed from an electrically conductive material. The terminal housing is molded around the first and second terminals and is mountable to the illumination device. Preferably, the terminal housing is injection molded around the first and second terminals.

Preferably, the bulb holder is formed by placing two metal stampings into a mold, one end of each stamping being the first terminal and the other end of that same stamping being the second terminal. After placing the stampings in the mold, a molding material is injected that flows within the mold to form the bulb holder/insulating housing. Upon removal from the mold, the individual stampings are located and electrically insulated so as to appropriately receive the illumination bulb at one end and directly connect to the vehicle electrics at the other. Preferably, a non-conducting, substantially insulating polymeric material is used, most preferably, one that has a Shore A durometer hardness of between approximately 50 Shore A and 105 Shore A so as to form a self-gasketing, substantially water impervious joint to the frame of the illumination device when the bulb holder is attached thereto.

In one form, the illumination device is mounted on the mirror housing. In another form, the illumination device is mounted on the mounting portion of the mirror assembly. Optionally, one or more illumination devices may be mounted at the mirror housing, the mirror mounting portion, and/or a separate illumination device housing attached to the mirror assembly.

These and other objects, advantages, purposes and features of this invention will become apparent upon review of the following specification in conjunction with the drawings.

BRIEF DESCRIPTION OF THE DRAWINGS

FIG. 3 is a perspective view of the bulb holder of FIG. 2, with a vehicle wiring connector shown removed therefrom;

FIG. 4 is a perspective view of a bulb receiving portion of the bulb holder of FIG. 3;

DESCRIPTION OF THE PREFERRED EMBODIMENTS

Figure 1:
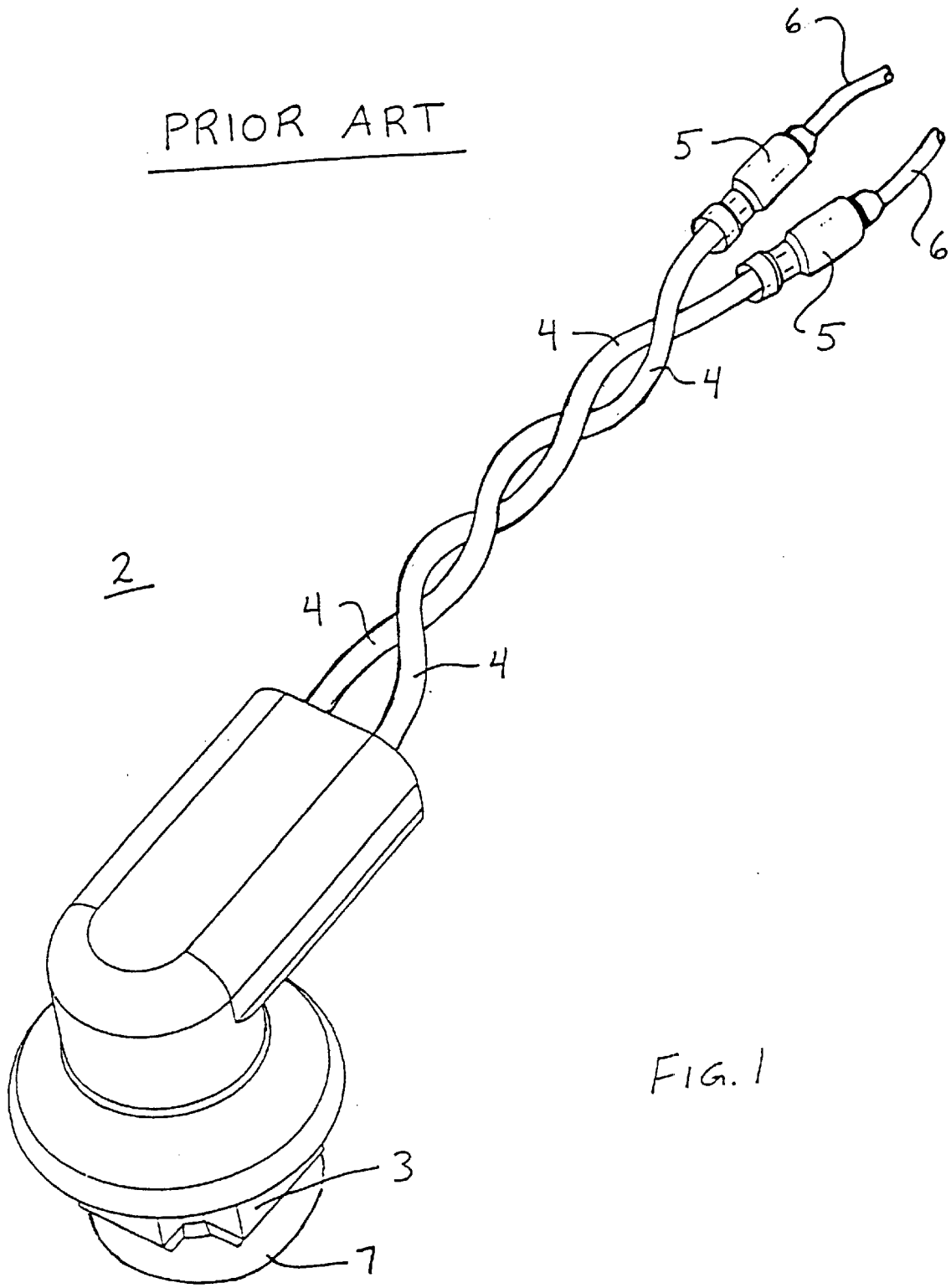
FIG. 1 is a perspective view of a prior art bulb holder for exterior rearview mirrors.
Figure 2:
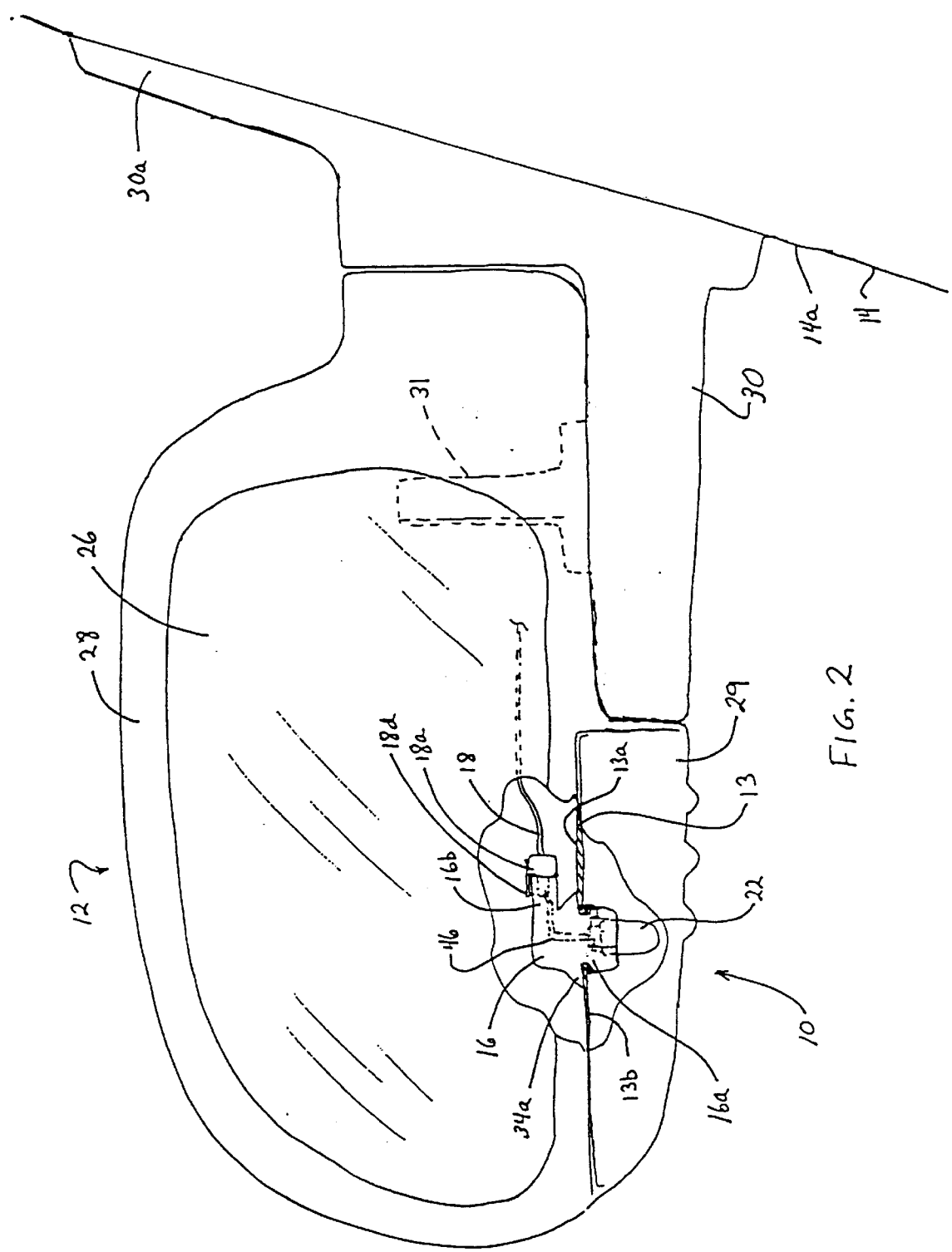
FIG. 2 is a view looking forwardly along a side of a vehicle of an exterior rearview mirror, shown partially in section to reveal an illumination device according to the present invention.

Referring now specifically to the drawings, and the illustrative embodiments depicted therein, an bulb holder or bulb socket 10 is mountable to an illumination device 29, which is mountable to an exterior rearview mirror assembly 12 along a side of a vehicle 14 (FIG. 2). Bulb holder 10 includes a body or housing 16, which includes a mounting portion 16a and a wire connecting portion 16b. Preferably, mounting portion 16a of illumination device 10 mounts to a panel or mounting flange 13 within a portion of illumination device 29 and/or mirror assembly 12, while wire connecting portion 16b receives or connects to a vehicle wiring or mirror wiring harness 18. The mirror wiring 18 may connect to or engage a pair of wiring terminals or connectors 20 (FIGS. 5 and 6) within wire connecting portion 16b, to provide power to bulb holder 10 via a vehicle wiring and vehicle power source or battery (not shown). An illumination source or bulb 22 may be plugged into or inserted within mounting portion 16a to engage a pair of bulb connectors or terminals 24 (FIG. 4). Bulb holder 10 is preferably easily and detachably installed to mounting panel 13 within a signal housing of illumination device 29, or elsewhere on or within the mirror assembly 12, to provide illumination outwardly therefrom.

The illumination device may be a turn signal or a brake lamp for providing a signal to drivers of vehicles rearwardly and/or sidewardly of vehicle 14, such as disclosed in commonly assigned, co-pending U.S. patent application, Ser. No. 09/335,010, filed Jun. 17, 1999 by Pastrick et al. for a VEHICLE EXTERIOR MIRROR SYSTEM WITH SIGNAL LIGHT, the disclosure of which is hereby incorporated herein by reference. Alternately, or in addition thereto, the illumination device may be a security or safety lamp which illuminates the area around mirror assembly 12 to provide safe access and entry of vehicle 14 in night-time conditions, such as disclosed in U.S. Pat. No. 5,371,659, filed Feb. 1, 1993 by Pastrick et al., U.S. Pat. No. 5,497,306, filed Apr. 21, 1995 by Pastrick, U.S. Pat. No. 5,823,654, filed Jul. 26, 1996 by Pastrick et al., and U.S. Pat. No. 5,669,699, filed Jan. 8, 1996 by Pastrick et al., the disclosures of which are hereby incorporated herein by reference, and as disclosed in commonly assigned, co-pending U.S. patent application, Ser. No. 09/102,414, filed Jun. 22, 1989 by Pastrick et al., the disclosure of which is hereby incorporated herein by reference. Although illustrated herein as being located along the bottom rim of the exterior rearview mirror housing, other locations are possible for the signal light of the present invention, including the top and outboard rim of the housing, or along the mounting portion or sail of the mirror assembly, as discussed below.

Exterior rearview mirror assembly 12 is preferably substantially similar to conventional exterior rearview mirror assemblies. Mirror assembly 12 includes a reflective element 26, which is adjustably positioned within a housing 28, as is known in the art. Mirror assembly 12 may further include a mounting portion 30, which is secured along a side 14a of vehicle 14, and which may further include a sail or trim portion 30a. Housing 28 and mounting portion 30 may be a one piece construction for fixedly mounting housing 28 relative to vehicle 14. Alternately, mirror assembly 12 may be a foldable mirror, such that housing 28 is pivotally mounted to mounting portion 30 and is pivotable about a pivot spindle 31 between an operative position, as shown in FIG. 2, and a folded position where housing 28 is folded alongside vehicle 14. Preferably, rearview mirror assembly 12 further includes a mirror wiring harness 18, which is electronically connectable to the vehicle wiring within the vehicle, for providing power and/or control to one or more electronic accessories within mirror assembly 12.

As best shown in FIGS. 3–6, bulb holder 10 of illumination device 29 may be generally L-shaped, with mounting portion 16a at one end and wire connecting portion 16b at an opposite end and extending generally 90 degrees from mounting portion 16a. Mounting portion 16a is preferably generally circular, and includes a bulb receiving cavity 32, which is defined by a generally cylindrical side wall 32a extending outwardly from a base 34. Cylindrical side wall 32a preferably includes a plurality of tabs or arms 36 extending radially outwardly from side wall 32a. The tabs 36, as shown in FIG. 4, are preferably generally rectangular and are tapered at an outer end 36a to ease insertion of mounting portion 16a into mounting panel 13 of illumination device 29 or mirror assembly 12. Preferably, tabs 36 include a slot or groove 36b at an inward end of each tab 36. This allows mounting portion 16a to be secured to illumination device 29 by insertion of mounting portion 16a and tabs 36 through a correspondingly formed opening (not shown) in a panel or flange 13 of the illumination device and subsequent rotation of bulb holder 10, such that the edges of the correspondingly formed opening slide within the grooves 36b and substantially preclude unintentional withdrawal of bulb holder 10 from illumination device 29 and/or mirror assembly 12.

Additionally, body 16 may include a lip portion 34a extending radially outwardly around base 34. Lip 34a may engage an upper surface 13a of mounting panel 13, while grooves 36b engage the edges of the opening through the mounting panel 13, to further retain and seal bulb holder 10 to the mounting panel 13. The lip seal 34a flexes when bulb holder 10 is inserted through the opening in mounting panel 13, which biases the bulb holder 10 upwardly to retain tabs 36 against a lower surface 13b of mounting panel 13, thereby substantially precluding unintentional rotation of bulb holder 10 in the opposite direction. The lip portion 34a engages upper surface 13a and thus forms a seal around the bulb holder 10.

Figure 6:
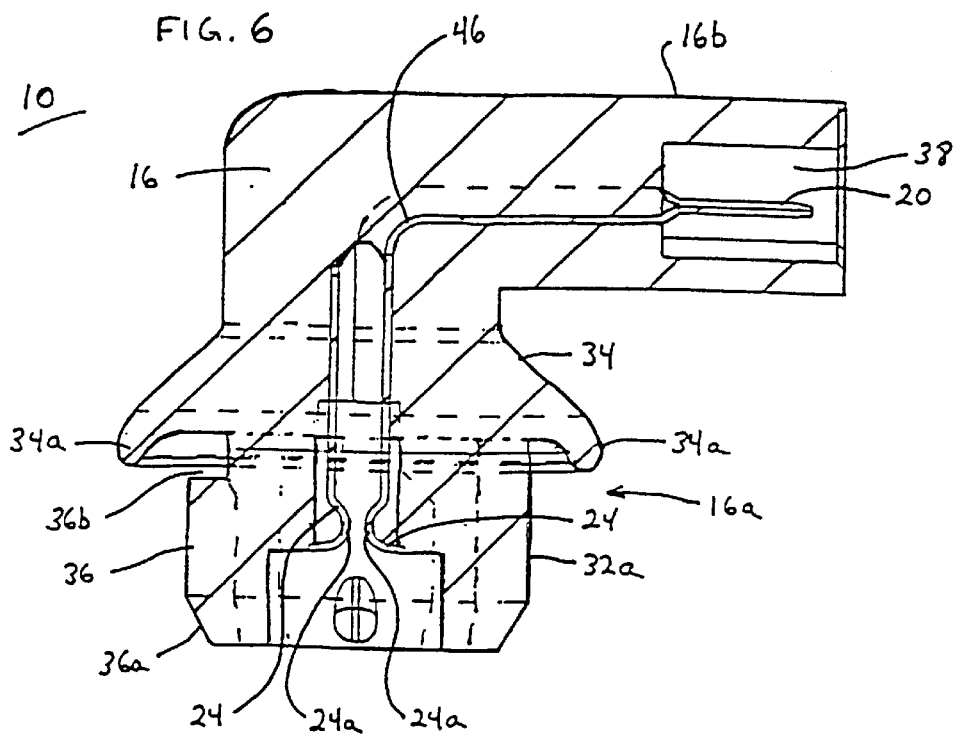
FIG. 6 is a sectional view of the bulb holder, taken along the line VI—VI in FIG. 5.

Bulb receiving cavity 32 further includes a slot or passageway 32b, which is formed to retain a pair of bulb contacts or terminals 24. Slot 32b and bulb terminals 24 receive an engaging or connecting end of the illumination source or bulb, while at least a portion of the illuminating portion of the bulb itself rests within the opening defined by side wall 32a. The terminals 24 engage corresponding electrically conductive contacts or terminals on the bulb for providing power to the bulb, as is well known in the art. As best seen in FIGS. 4 and 6, each bulb terminal 24 comprises a pair of opposite contacts which are curved or rounded at an outer end 24a to ease insertion of bulb 22 therebetween. Outer end 24a of bulb terminals 24 are curved inwardly toward each other and biased in that position to maintain contact with bulb 22 when it is inserted between each of the pairs of contacts. One or more radially inwardly protruding members 32c may further be included on side walls 32a to engage bulb 22 and reduce vibration of the bulb.

Figure 5:
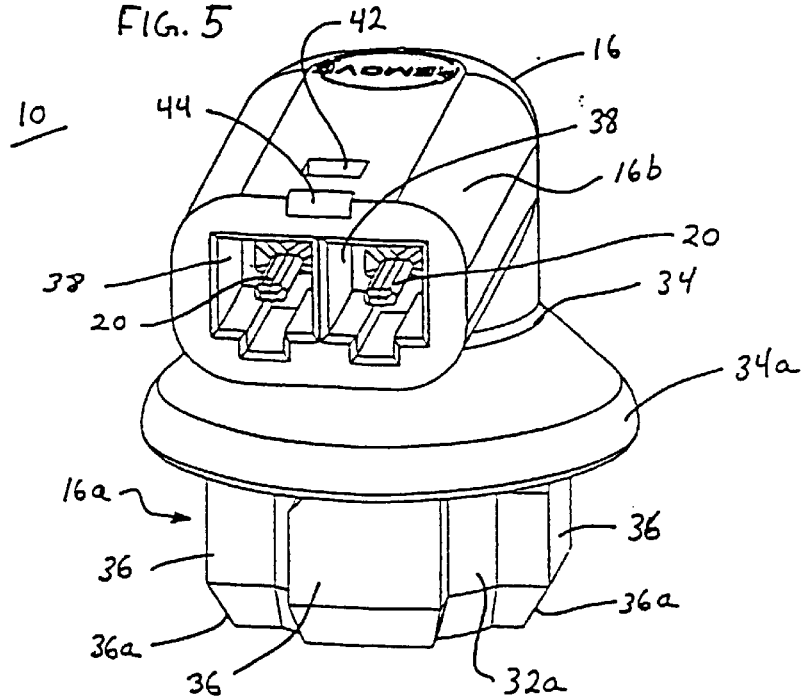
FIG. 5 is a perspective view of a wiring connector of the bulb holder of FIG. 3.

As shown in FIGS. 5 and 6, wire portion 16b of bulb holder 10 includes a pair of recesses 38 for receiving a portion of a wire connector 18a on mirror wiring harness 18. Preferably, a connecting terminal 20 extends along and within each of the recesses 38 and is engagable with a correspondingly formed female terminal 18c on connector 18a of wiring harness 18 as each connector housing 18b is inserted within recesses 38 of bulb holder 10. Most preferably, wire portion 16b and terminals 20 are formed to be engagable with a conventional wiring connector 18a, such as the standard two-pin connector shown in FIG. 3. Clearly, however, other means for connecting the terminal 20 of bulb holder 10 to wiring terminal 18c may be implemented, without affecting the scope of the present invention. Wire portion 16b may further include a latch detail or opening 42, for engaging and retaining a clip or tab 18d on connector 18a when connector 18a is inserted into wire portion 16b, thereby retaining connector 18a to bulb holder 10 and substantially precluding unintentional removal of connector 18a from wire portion 16b. Preferably, a tapered notch 44 may be provided at an outer end 16c of wire portion 16b to guide latching member 18d as connector 18a is inserted into wire portion 16b of bulb holder 10.

As shown in FIG. 6, each bulb terminal 24 is connected to a corresponding wire connecting terminal 20 to form a single terminal member 46. Preferably, each bulb terminal 24 and corresponding wire connecting terminal 20 are integrally formed as a single metal stamping 46. The stampings are preferably rigid stampings formed of a copper, brass, tin plated brass, or similar metals or alloys, including stainless steel or any other electrically conductive metal.

Preferably, body 16 of bulb holder 10 is injection molded with at least two stampings 46. Body 16 may be molded from a flexible polymeric material, preferably having a Shore A durometer hardness of between approximately 50 Shore A and 105 Shore A, more preferably between approximately 60 Shore A and 90 Shore A, and most preferably approximately 60 Shore A, such as a thermoplastic elastomer (TPE) material, such as Kraton G7720B or the like. Alternatively, a plasticized poly vinyl chloride (PVC) material, a flexible urethane, a silicone or the like may be used, without affecting the scope of the present invention. By injection molding of body 16 with the stampings within the flexible material, the present invention assures a watertight construction to substantially preclude water from entering the terminals 20 and 24 within body 16.

Preferably, bulb holder 10 is inserted through the correspondingly formed opening in mounting panel 13 and retained therein via rotation of illumination device approximately 90 degrees or a quarter turn. Connector 18a is also easily connected to wire receiving portion 16b of bulb holder 10. Connector 18a is inserted into wire portion 16b until tab 18d engages latch detail 42, which provides a positive connection between the connector 18 and bulb holder 10.

Although shown and described as being generally L-shaped, clearly bulb holder 10 may be formed in other shapes as well. For example, mounting portion 16a may be at one end of a generally cylindrical illumination device, while wire receiving portion 16b extends generally longitudinally therefrom. The stamped terminal members may then be substantially straight stampings to further simplify the design. However, these stampings may require additional tabs or retaining members to be molded within body 16 in order to limit or preclude longitudinal movement of the stamped terminals relative to body 16 as the wire connector and/or bulb are attached thereto.

Because bulb holder 10 includes a wiring connector integrally formed with the bulb portion, the present invention provides a low cost illumination device which does not require additional wires and connectors to be soldered, crimped, or clamped to a portion of the bulb terminals, thereby obviating this process from the manufacturing process. This facilitates easy connection of the mirror wiring 18 to the bulb holder 10 before or after it is installed in the illumination device 29 of the mirror assembly 12. Preferably, the bulb holder is installed to the mirror assembly via a quarter turn latching means. Because the preferred material of the bulb holder is soft flexible rubber like material, this further facilitates easy installation of the bulb holder to the illumination device and/or the mirror and of the wiring connector to the wiring terminals, while substantially precluding water intrusion into the bulb holder and the illumination device, and thus rendering the part substantially water impervious.

Bulb 22 may be a conventional incandescent or halogen lamp, a conventional incandescent fuse lamp, a vacuum fluorescent lamp, which is available in various colors, a light emitting diode (LED) (such as a red light LED, a blue light LED, an amber light LED, a red-orange light LED, a white light LED, or a cluster or array thereof), a phosphorescent element or the like. In the event that the light emitting source or bulb comprises a light emitting diode, a resistor is preferably connected in series with a respective light emitting diode to act as a voltage divider so as to reduce the ignition voltage of the vehicle, which is in the range of 9 to 16 volts (normally 12 volts), for the desired operating voltage of the light emitting diode, which is typically on the order of about 1 volt to about 5 volts. Each resistor preferably has a resistance of less than about 1,500 ohms and greater than about 100 ohms, more preferably, less than about 1,000 ohms and greater than about 200 ohms. Alternately, non-LED, non-incandescent light emitting sources can be used, such as electro-illuminescent sources or semiconductor laser sources. Electro-illuminescent sources may be either inorganic or organic electro-illuminescent sources. These light emitting sources preferably have well defined light patterns, such as a cone of directed light which eliminates the need for reflectors or other separate optical components that direct the light where desired.

The light source or bulb itself may be colored to provide colored light, such as red for a brake lamp or amber for a turn signal indicator. Alternately, a lens or filter may be used to change the color of the light as it passes therethrough. The filter may be part of the illumination device or part of the exterior housing portion of the mirror assembly in the area which the illumination device is installed. The housing may be colored for the appropriate signal light, or may be substantially clear in situations where the illumination device is a security light or the like. The filter may otherwise be a clear or colored panel mounted to a portion of the mirror housing and encasing the illumination device.

Figure 7:
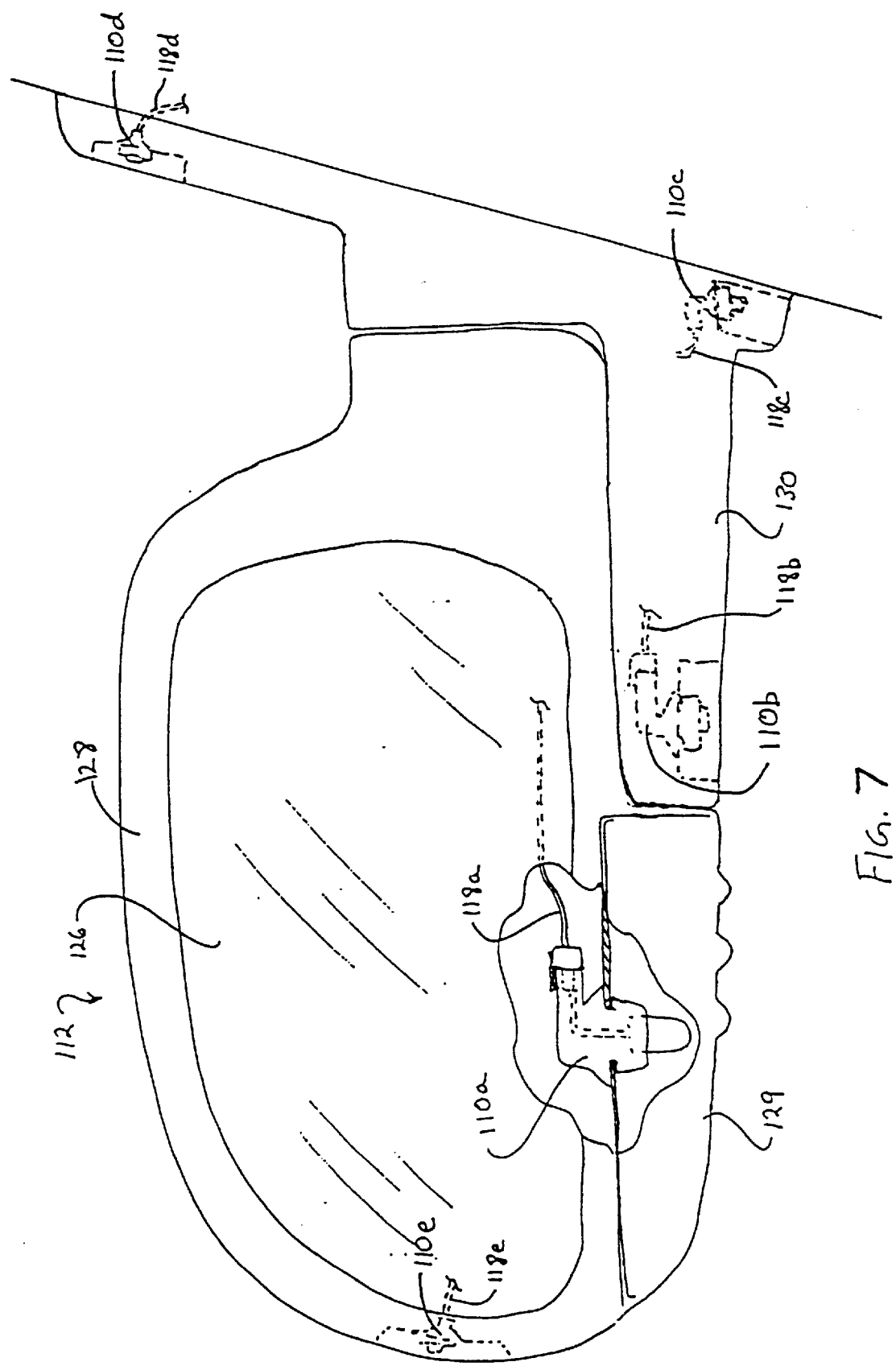
FIG. 7 is the same view as FIG. 2, showing locations for one or more illumination devices in accordance with the present invention.

Although shown and described as having an illumination device 29 at a lower portion of mirror housing 28, clearly the scope of the present invention includes one or more illumination devices located elsewhere on mirror assembly 12. Referring now to FIG. 7, a mirror assembly 112 is shown which comprises a mirror housing 128 for adjustably mounting a reflective surface 126 therewithin, a mounting portion 130 and a lower signal housing 129. One or more bulb holders and/or illumination devices may be provided within or adjacent to a surface of mirror assembly 112. For example, as shown in FIG. 7, an illumination device 10a may be provided in signal housing 129, while additional illumination devices 110b, 110c, 110d and 110e may be positioned along a lower portion of the mirror mounting portion 130, a lower or upper portion of the sail, or an outer portion of the mirror housing 128, respectively. Clearly, other locations may be utilized, such as within the mirror housing 128, without affecting the scope of the present invention. The illumination devices 110a, 110b, 110c, 110d and 110e may be one or more brake lamps, turn signal indicators, or security lights or the like. Preferably, the indicators 110a, 110b, 110c, 110d and 110e are substantially similar to illumination device 10 discussed above, and may be easily installed to their respective portions of mirror assembly 112 and further easily connected to a mirror or vehicle wiring harness 118a, 118b, 118c, 118d, and 118e, respectively.

Each of the electrical wirings 18a, 18b, 18c, 18d, and 18e may route within housing 128 of mirror assembly 112 and through one or more openings (not shown) provided along a perimeter wall of the housing adjacent to the vehicle. Optionally, the housing may include an electrical outlet or plug to which the electrical wirings are coupled for coupling to the electrical system of the vehicle. In addition, the light sources may be coupled to and powered by a circuit board mounted within housing 128, which is electrically coupled to the electrical system of the vehicle. Furthermore, the light sources may be powered by flexible circuitry, which is electrically coupled to the electrical system of the vehicle or any other suitable conventional power supply system. Alternately, each individual wire may project from housing 128 for individually coupling to the electrical system of the vehicle.

It is further envisioned that each of the one or more bulb holders of the present invention may comprise additional terminal members, such as four or more, in order to engage four or more wires in the mirror harness to then be operable to energize two or more illumination bulbs. The bulb holder may then be easily connected to a connector of the vehicle or mirror wire harness, such as to a four, six or eight pin connector or the like. The additional illumination bulb or bulbs may provide the same or different signals than the one another (such as one bulb being a stop lamp and the other bulb being a turn signal indicator). Furthermore, the multiple illumination bulbs powered by the bulb holder may vary in color, such that, for example, one provides red illumination while another provides amber illumination. The bulb holder of the present invention thus facilitates mounting of two or more bulbs within a single illumination device at the rearview mirror assembly, while requiring only one economical, integrally molded bulb holder.

Therefore, the present invention provides a low cost illumination device for an exterior rearview mirror. The bulb holder of the illumination device preferably comprises a soft plastic body which is preferably injection molded about a pair of terminal stampings. One end of the terminal stampings provides for a connection with an illumination source, such as a light bulb or the like, while the other end provides for connection to a terminal on a vehicle wiring harness connector. By facilitating connection of the vehicle wiring directly to the illumination device, the present invention precludes the necessity of additional wires being attached to the bulb terminals and pigtailed or otherwise bound together to extend from an end of the illumination device, thereby reducing the overall cost of the illumination device. Furthermore, the soft, flexible polymeric material facilitates easy and water tight installation of the illumination device onto a mounting portion of the mirror assembly.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. An illumination device for use in an exterior rearview mirror assembly of a vehicle, said illumination device comprising:
   a first connecting terminal for electrically connecting to an illumination source;
   a second connecting terminal for electrically connecting to a vehicle wiring, said second connecting terminal connected to said first connecting terminal by a connecting member, said second connecting terminal adapted to connect directly with the vehicle wiring in order to provide electrical power to the illumination source; and
   a housing at least partially encasing said first and second connecting terminals, said housing being mountable to the exterior rearview mirror assembly.

2. The illumination device of claim 1, wherein said connecting member comprises a substantially rigid connecting member.

3. The illumination device of claim 1, wherein the illumination source comprises at least one of an incandescent lamp, a halogen lamp, an incandescent fuse lamp, a vacuum fluorescent lamp, a light emitting diode, a phosphorescent element, an electro-luminescent source and a semiconductor laser source.

4. The illumination device of claim 1, wherein the illumination source comprises an incandescent lamp.

5. The illumination device of claim 1, wherein the illumination source comprises a light emitting diode.

6. The illumination device of claim 1, wherein said first and second connecting terminals comprise a pair of first and second connecting terminals for connecting to correspondingly formed pairs of terminals on the illumination source and on the vehicle wiring, respectively.

7. The illumination device of claim 6, wherein said housing is adapted to receive the pair of terminals on the vehicle wiring.

8. The illumination device of claim 6, wherein said housing is adapted to receive the pair of terminals on the illumination source.

9. The illumination device of claim 1, wherein said first and second connecting terminals are integrally formed together from an electrically conductive material.

10. The illumination device of claim 9, wherein said connecting terminals comprise at least one integrally formed metal member.

11. The illumination device of claim 10, wherein said integrally formed metal member comprises a metal stamping.

12. The illumination device of claim 10, wherein said housing is integrally molded with said at least one integrally formed metal member.

13. The illumination device of claim 1, wherein said housing is insert molded around said first and second connecting terminals.

14. An illumination device for use in an exterior rearview mirror assembly of a vehicle, said illumination device comprising:

a first connecting terminal adapted for electrically connecting to an illumination source;

a second connecting terminal adapted for electrically connecting to a vehicle wiring in order to provide electrical power to the illumination source, said first and second connecting terminals being connected together and defining a generally rigid connecting member; and a housing at least partially encasing said first and second connecting terminals, said housing being mountable to the exterior rearview mirror assembly.

15. The illumination device of claim 14, the illumination source comprises at least one of an incandescent lamp, a halogen lamp, an incandescent fuse lamp, a vacuum fluorescent lamp, a light emitting diode, a phosphorescent element, an electro-luminescent source and a semiconductor laser source.

16. The illumination device of claim 14, wherein the illumination source comprises an incandescent lamp.

17. The illumination device of claim 14, wherein the illumination source comprises a light emitting diode.

18. The illumination device of claim 14, wherein said first and second connecting terminals comprise a pair of first and second connecting terminals for connecting to correspondingly formed pairs of terminals on the illumination source and on the vehicle wiring, respectively.

19. The illumination device of claim 18, wherein said housing is adapted to receive the pair of terminals on the vehicle wiring.

20. The illumination device of claim 18, wherein said housing is adapted to receive the pair of terminals on the illumination source.

21. The illumination device of claim 14, wherein said first and second connecting terminals are integrally formed together from an electrically conductive material to define at least one integrally formed connecting member.

22. The illumination device of claim 21, wherein said housing is integrally molded with said at least one integrally formed connecting member.

23. The illumination device of claim 14, wherein said housing is insert molded at least partially around said first and second connecting terminals.

* * * * *

UNITED STATES PATENT AND TRADEMARK OFFICE
CERTIFICATE OF CORRECTION

PATENT NO. : 6,582,109 B2
DATED : June 24, 2003
INVENTOR(S) : Larry E. Miller

It is certified that error appears in the above-identified patent and that said Letters Patent is hereby corrected as shown below:

Column 3,
Line 46, insert -- ,now U.S. Patent No. 6,276,821 -- after "LIGHT"
Line 58, "1989" should be -- 1998 --
Line 58, insert -- ,now U.S. Patent No. 6,176,602 -- after "et al."

Column 7,
Line 5, "10a" should be -- 110a --

Column 9,
Line 12, insert -- wherein -- after "Claim 14"

Signed and Sealed this

Twenty-fourth Day of May, 2005

JON W. DUDAS
*Director of the United States Patent and Trademark Office*